Dec. 1, 1936.　　　　E. D. LILJA　　　2,062,322
ALTERNATING CURRENT MOTOR
Original Filed Feb. 1, 1932　　2 Sheets-Sheet 1
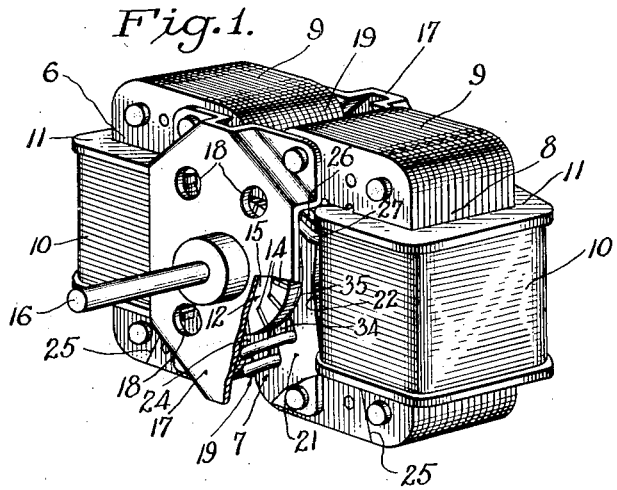
INVENTOR
Edgar D. Lilja
BY
ATTORNEYS Dec. 1, 1936.   E. D. LILJA   2,062,322
ALTERNATING CURRENT MOTOR
Original Filed Feb. 1, 1932   2 Sheets-Sheet 2
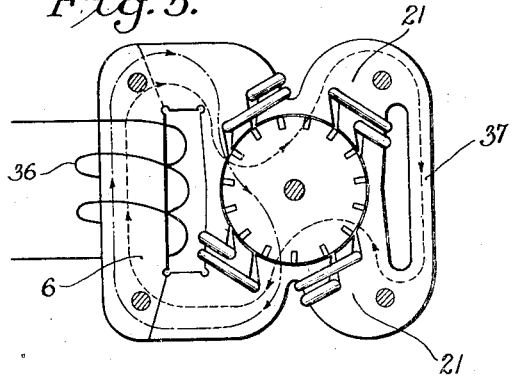
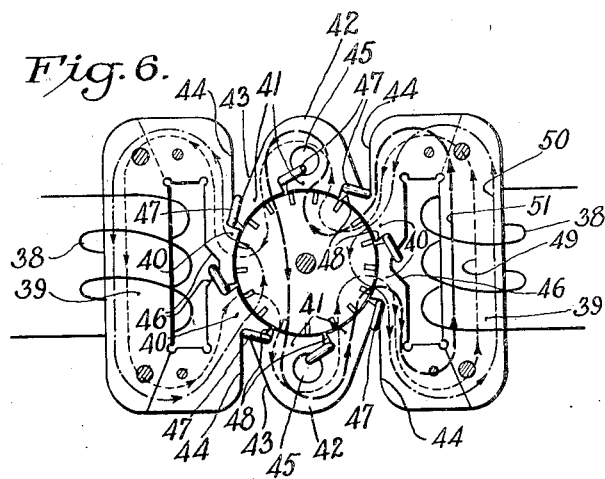
INVENTOR
Edgar D. Lilja
BY
Lindahl, Parker & Carlson
ATTORNEYS Patented Dec. 1, 1936

2,062,322

UNITED STATES PATENT OFFICE 2,062,322

ALTERNATING CURRENT MOTOR

Edgar D. Lilja, Rockford, Ill., assignor to Howard D. Colman, Rockford, Ill.

Application February 1, 1932, Serial No. 590,026
Renewed June 17, 1935

12 Claims. (Cl. 172—278)

This invention relates to fractional horse power alternating current motors and more particularly to those of the induction type in which shifting of the magnetic field is produced by the action of shading coils partially enclosing the motor poles.

Shading ring motors having two-pole stators of the core type are ordinarily preferred to those with shell type stators owing to the lower cost of manufacture of the former and the higher starting torque and power output obtained for a given size of motor. The higher volumetric efficiency of core type motors is due to the better ventilation of the component parts and to the location of the primary winding remotely from and out of good inductive relation with respect to the shading coils which are mounted adjacent the rotor. Two-pole core type motors are, however, inherently limited as to size and have a maximum synchronous speed; consequently it has been necessary heretofore for certain applications requiring slower speed and greater power, to employ motors of the shell type in spite of their lower volumetric efficiency and more costly stator construction.

The primary object of the present invention is to provide a new and improved shading ring motor which develops substantially greater power than can be obtained with ordinary two-pole core type motors and yet possesses substantially all of the advantages inherent in motors having stators of the core type.

The invention also resides in the novel construction of the stator forming the poles, in the arrangement of the shading rings thereon, and in the manner of defining the differently shaded areas of the pole faces.

Other objects and advantages of the invention will become apparent from the following detailed description taken in connection with the accompanying drawings, in which Figure 1 is a perspective view of an alternating current motor embodying the novel features of the present invention.

Fig. 2 is an actual size side elevational view of the motor shown in Fig. 1, one of the bearings being omitted and the primary windings shown in section.

Fig. 3 is a sectional view taken along the line 3—3 of Fig. 2.

Fig. 4 is a perspective view of one of the stator laminations.

Figs. 5 and 6 are views similar to Fig. 2 showing motors embodying modified forms of the invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The stator or field member of the preferred form of the invention shown in Figs. 1 to 4 comprises generally three laminated legs or bars 6, 7 and 8 of magnetic material spaced apart in parallel relation and magnetically joined at their ends by lateral arms 9 of substantially the same cross-sectional area as the legs 6 and 8. The latter legs which are straight and substantially less legs which are straight and substantially less in width than the thickness of the stack of laminations, constitute magnetic cores for primary windings 10 coiled upon spools 11 with the wire of the windings distributed along the cores and substantially filling the space between each core leg and the adjacent stator leg 7. The windings 10 constitute separate sources of magneto-motive force, the combined magnitudes of which are such as to maintain a high degree of saturation in the stator iron.

The intermediate stator leg is substantially wider than the cores 6 and 8 and is apertured at its center to define a cylindrical recess in which is disposed a rotor 12 preferably of the squirrel cage type having a laminated iron core 13 with inductor bars 14 spaced around its periphery and joined at their ends by copper disks 15. The rotor shaft 16 is journaled at opposite ends of the rotor in bearings supported by plates 17 made rigid at their corners with the field member and formed with holes 18 to permit of air circulation around the rotor and adjacent parts.

At its opposite ends, the stator leg 7 is formed with inwardly converging notches 19 terminating close to the rotor recess and dividing each end portion of the leg into two pole projections 20 and 21 integral with the arms 9 at opposite ends of the cores 6 and 8. Being formed from the end portions of the stator leg 7, the projections joined to the same core 6 or 8 are angularly spaced farther apart than the adjacent projections which are joined to different cores. The faces of the pole projections conform to the curvature of the rotor surface and are annularly spaced around and exposed to the same. For a purpose to appear later, the opposite side surfaces of each pole projection are preferably inclined relative to each other with the surfaces 22 of adjacent poles disposed substantially in longitudinal alinement and extending substantially parallel to the axes of the coils 10. The adjacent side tips of the projections joined to each coil leg 6 or 8 are thus integrally joined by magnetic connections 23 of relatively narrow radial width. By joining the adjacent side tips of the adjacent projections 20 and 21 through the medium of the magnetic connections 24, the stator laminations may be formed in one integral piece (Fig. 4) which preferably is slitted along lines 25 to enable one end of the leg 7 to be flexed relative to the cores 6 and 8 while the latter are inserted simultaneously through the spools 11. By rotating the alternate laminations through a half revolution about the rotor axis, the cores of adjacent laminations may be inserted in opposite ends of the spools 11 forming lapped joints at opposite ends of the cores 6 and 8. All of the stator laminations are of the same form which, it will be observed, is made possible by making the diametrically opposite poles of the same shape although the adjacent poles are differently shaped.

To produce shifting of the magnetic field across the face of each pole and rotation of the field around the rotor recess, the corresponding side portions of the poles are enclosed by short-circuited coils preferably in the form of single turn rings, there being two rings 26 and 27 of different sizes on each pole in the present instance for the purpose of producing a more progressive shifting of the flux than would be obtained with only one ring. To facilitate assembly on the stator, each ring is preferably composed of two separable parts one of which comprises a U-shaped piece of round copper wire having one leg inserted through a hole 29 in the pole and the other leg lying in a notch 30 in a side surface of the pole.

Preferably each of the smaller rings 26 encloses approximately one-third of the transverse sectional area of the pole on which it is mounted and the large ring encloses the same sectional area as the small ring and also an adjacent additional area equal approximately to one-third of the pole section. Each pole is thus divided into an unshaded section on one side thereof, an intermediate single-shaded section, and a double-shaded section on the other side. Slots 31 and 32 tapering from the holes 29 to the rotor recess and separating the differently shaded sections define unshaded, single-shaded and double-shaded areas 33, 34 and 35 at the face of each pole projection. Herein the shading rings on each pole are disposed closely adjacent each other in parallel planes extending substantially at right angles to the longitudinal center line of the pole projections.

It will be observed that the magnetic connections 23 and 24 between the shaded side tip of one pole and the unshaded side tip of the adjacent pole constitute extensions of such unshaded tips which extensions have an inner surface closely following the rotor surface and serve to enlarge the range of distribution to the rotor iron of the flux threading the unshaded section of the pole. The latter constitutes the predominating component of the magnetic field threading each pole so that by providing for utilization in the rotor iron of an increased amount of available unshaded flux, the motor output is accordingly improved.

Leakage of the unshaded flux directly from the unshaded side tip of one pole without utilization thereof in the rotor is effectually avoided by constructing the shading rings of such low resistance that a high magneto-motive force will be produced by the high currents induced therein. Such magneto-motive force opposes the leakage of unshaded flux directly from one pole to the adjacent pole thereby causing the desired amount of unshaded flux to be diverted into the rotor iron and the latter to be maintained highly saturated.

From the foregoing it will be apparent that the poles 21 are directly connected to a core which is linked by one winding 10. The poles 20 are connected to the other core. It is necessary to establish a magnetic relationship between the windings 10 such that the two windings will act cumulatively to cause magnetic flux to thread the poles in directions to make the adjacent poles of the motor of opposite sign and the alternate poles of the same sign. This relationship is attained in the present instance by connecting the primary windings with the alternating current source so that the flux threading the cores 6 and 8 at any instant will be in opposite directions. In this way, part of the flux threading the unshaded pole section, for example, may take a path through the unshaded sections of all of the poles indicated by the dotted line 38 while another part may take a path 39 through the unshaded section of the poles supplied with flux from a common winding 10. The notches 19 effectually separate the pole projections 20 and 21 and thereby prevent the leakage of any substantial amount of flux directly between these poles thereby causing the unshaded flux to assume the paths 38 and 39. By tapering the notches as above described, the desired sectional area of the pole projections is obtained and the leakage at the same time effectually minimized.

In order to obtain maximum efficiency in the operation of the motor, it is necessary that the space relation of the corresponding areas of adjacent poles be the same as the phase displacement of the flux threading such areas. In the present four-pole motor, this phase displacement is 180 electrical degrees which corresponds to 90 space degrees, but it is impossible, without sacrifice in compactness of arrangement, to space each pole projection exactly at right angles to each adjacent projection. Thus for the sake of compactness, the unshaded sections of the projections 21 joined to the same core are spaced a greater angular distance apart than the unshaded section of adjacent projections 20 and 21 joined to different cores.

To provide for the desired ninety degree space relation of the pole faces, the slots 31 and 32 of non-magnetic medium which separate the differently shaded areas of each pole are inclined relative to the longitudinal center line of the pole or to the planes of the shading rings so that the unshaded, single-shaded and double-shaded areas 33, 34 and 35 of each pole are shifted around the rotor in the direction of the pole joined to the same core. A ninety degree space relation of the correspondingly shaded areas of the poles is obtained in the present motor with the slots 31 and 32 extending substantially parallel to the axes of the coils 10. In the present instance, such shifting of the positions of the differently shaded pole areas without unduly restricting the pole sections terminating at such areas is made possible by extending the sides 22 of the pole projections approximately parallel to the coil axes as above described while the other sides of the pole projections are disposed approximately radially. Thus, the opposite sides of each pole projection diverge relative to each other and toward the rotor.

In order that the shading ring slots 29 will be of approximately the same length for all poles, the small rings 26, in the case of the poles whose shading rings are disposed in the notches 19, are disposed farther from the rotor recess than the large rings. On the other poles, the small ring extends through the pole at a point closer to the rotor than the larger ring.

If desired a four-pole motor operating in the same manner as the motor above described may be formed with only one source of magneto-motive force. Such a motor is shown in Fig. 5 with a stator constructed similar to the one above described and having all four poles supplied with magnetic flux from a single winding 36. To reduce the overall dimensions of this motor to a minimum, the leg 37 of the stator which provides a magnetic connection between poles 21 may be made of substantially narrower width than the winding leg 6 owing to the fact that a smaller proportion of the total flux will thread the poles 21 than in the case of the motor first above described. As shown by the dotted and dot-dash lines, the flux assumes paths similar to those in the motor shown in Fig. 2.

When operating upon standard 60 cycle alternating current, the synchronous speed of the motors shown in Figs. 2 and 5 is 1800 R. P. M. owing to their four-pole construction. For still lower speeds, a larger even number of poles may be employed. When the stator is made with eight poles, as shown in Fig. 6, it is preferred to employ two primary windings 38 linking cores 39 which are connected at opposite ends to poles 40. Interposed between the poles 40 supplied with flux from different windings are two poles 41 integral with opposite ends of a magnetic member 42 which has outwardly converging surfaces 43 forming V-shaped notches with the surfaces 44 of the adjacent poles 40, thereby avoiding any substantial flux leakage between the adjacent poles 40 and 41. The adjacent pole projections 41 are separated by an aperture 45. To enable the adjacent faces of the poles 40 to be spaced close together, the projections forming these poles are extended toward each other in longitudinal alinement and formed with inwardly converging surfaces 46 forming a notch between the poles. The notch or the aperture between each adjacent pair of poles terminates short of the rotor recess defined by the pole faces so that each side tip of each pole is integrally and magnetically joined to the adjacent side tip of the adjacent pole.

To cause shifting of the magnetic field around the rotor, short-circuited or shading rings 47 are mounted on the poles enclosing corresponding side portions thereof adjacent the rotor. Each ring extends through an aperture 48 and has its opposite side disposed either in one of the stator notches or in one of the apertures 45. Preferably, each ring encloses one-third to one-half of the sectional area of the pole on which it is mounted and the recesses 48 communicate with the rotor recess at angles such that correspondingly shaded areas of the pole faces are spaced equidistantly around the rotor.

As in the case of the motor shown in Fig. 2, the windings 38 are connected to the source of alternating current so that the magneto-motive forces produced thereby act in opposite directions as indicated by the arrows on the lines 49, 50 which represent the different paths which may be taken by the flux threading the unshaded areas of the poles. The projections 40 and 41 are thus polarized with the adjacent poles of opposite sign and the alternate poles of the same sign. The motor thus constructed has a synchronous speed of 900 R. P. M. when operating upon 60 cycle alternating current.

It will be apparent that in each of the motors above described, the primary windings are located remotely from and out of good inductive relation with respect to the shading coils, thereby avoiding the shading losses inherent in shell type stators and enabling the magnetic parts to be worked efficiently at a high degree of saturation. By reason of the increased number of poles, such motors may be made of greater capacities than two-pole core type motors and operate at a slower speed resulting in the development of a substantially higher torque than two-pole motors. At the same time such motors possess a substantially higher volumetric efficiency than those having stators of the shell type.

In each the motors above described, the stator laminations comprise one integral piece of sheet metal which results from the provision of an integral magnetic connection between the side tips of the adjacent poles which are joined to the different winding cores. Moreover, since the laminations are symmetrical in shape with respect to a diameter of the rotor extending perpendicular to the cores 6 and 8, all of the laminations may be of identical construction alternately arranged to form lapped joints at opposite ends of the cores. In view of the integral and symmetrical construction of the laminations and the manner of assembly of the windings thereon, advantage is taken of all of the inherent characteristics of two pole core-type motors as regards simplicity of construction and manufacture.

I claim as my invention:

1. An alternating current motor combining a rotor, a field member having three substantially parallel legs magnetically joined at opposite ends with the intermediate leg forming four pole projections having end faces exposed to said rotor, the projections joined to the same outer leg being angularly spaced farther apart than the adjacent projections joined to the different outer legs, a primary winding on at least one of said outer legs, short-circuited coils adjacent said rotor shading corresponding side portions of the poles, said projections having gaps of non-magnetic media therein separating the shaded and unshaded sections thereof and extending along the projections at an angle to the longitudinal center line thereof such as to space correspondingly shaded areas of the different poles substantially equal distances apart.

2. In an alternating current motor, the combination of a rotor, a field member providing four pole projections unevenly spaced around said rotor having end faces exposed to the rotor and defining a recess adapted to receive said rotor, a shading coil on each projection adjacent the rotor extending through a recess in the projection and enclosing one side portion thereof, each projection having a non-magnetic gap therein between said shading coil and rotor recess extending at an angle relative to the longitudinal center line of the projection and spacing the correspondingly shaded areas of the different pole faces approximately ninety degrees apart.

3. An alternating current motor combining a rotor, two pairs of pole projections spaced around said rotor with the adjacent side surfaces of the adjacent poles of different pairs defining a notch which converges toward said rotor, two magnetic members on opposite sides of said rotor each joining the projections of one of said pairs, a primary winding on at least one of said members, a pair of shading rings enclosing sectional areas of different sizes on each of said projections adjacent the rotor enclosing corresponding side portions of the poles to produce unidirectional shifting of the magnetic field around the rotor recess, the larger ring of each pair disposed in one of said notches extending through its pole closer to the rotor than the small ring and the smaller ring on each other pole extending through its pole closer to the rotor than the larger ring.

4. An alternating current motor having, in combination, a rotor, a plurality of pairs of pole projections annularly spaced around and having end surfaces facing said rotor, two magnetic members disposed on opposite sides of said rotor and integrally joined at their opposite ends to the different projections, and shading rings enclosing corresponding side sections of said projections, each of said projections having a slot extending generally longitudinally thereof to the end surface of the projection and receiving one side portion of the shading ring thereon, the slots on the adjacent projections being oppositely inclined relative to the planes of the associated shading rings.

5. In an alternating current motor, the combination of two energizing coils, and a plurality of one-piece stator laminations each comprising a plurality of pole projections defining a circular rotor recess, at least a part of said pole projections being integrally joined together, each of said projections having an aperture therein adjacent said recess for receiving a shading ring, and two elongated parallel cores on opposite sides of said recess having corresponding ends integrally joined to two of said pole projections and the opposite ends magnetically connected but mechanically severed from two other projections whereby to permit lateral flexure of said latter ends relative to the latter projections and projection of said two cores simultaneously through said coils.

6. In an alternating current motor, a plurality of one piece stator laminations each comprising a plurality of annularly spaced projections having adjacent side tips integrally joined and defining a circular rotor recess, and two elongated legs disposed on opposite sides of said recess and each magnetically joined at opposite ends to the outer ends of a pair of said projections, said projections having apertures for receiving shading rings extending generally longitudinally of but at an angle to the projections and arranged symmetrically relative to the center of the rotor whereby the apertures in superposed laminations will be in registry even though alternate laminations be rotated 180 degrees about the center of the rotor.

7. An alternating current motor having, in combination, a rotor, a plurality of pairs of annularly spaced pole projections with the adjacent side tips of the adjacent poles magnetically connected, a plurality of magnetic members each connecting one pair of said projections remote from said rotor, and an exciting winding enclosing at least one of said members, the opposite side surfaces of each of said projections diverging relative to each other and toward said rotor.

8. An alternating current motor having, in combination, a rotor, two elongated magnetic bars disposed in substantially parallel relation on opposite sides of said rotor and spaced therefrom, four radially disposed pole projections annularly spaced around said rotor and magnetically joined at their outermost ends to the ends of said bars, the side surfaces of one pair of said projections adjacent one of said bars being disposed substantially in longitudinal alinement and cooperating with the bar to form a substantially rectangular aperture, a winding enclosing said last mentioned bar and substantially filling said aperture, shading coils adjacent the rotor and enclosing corresponding side portions of said pole projections and extending through recesses communicating with the rotor recess defined by said projections and spaced to divide the pole faces into shaded and unshaded areas uniformly spaced around the rotor.

9. An alternating current motor having, in combination, a rotor, a plurality of pairs of annularly spaced radially extending pole projections having inner ends facing said rotor, means shading corresponding side portions of the pole faces, each of said projections having a single magnetic connection extending from the outer end thereof and connected to the outer end of an adjacent projection, and an alternating current winding enclosing certain of said connections the other of the connections being left unenclosed but providing a path through the associated pole projections for the flux produced by energization of said winding.

10. An alternating current motor having, in combination, a rotor, a plurality of pairs of annularly spaced radially extending pole projections having inner ends facing said rotor, means shading corresponding side portions of the pole faces, each of said projections having a single magnetic connection extending from the outer end thereof and connected to the outer end of an adjacent projection, certain of said connections cooperating with the side surfaces of the pole projections joined thereby to define an elongated opening, and an alternating current winding enclosing the latter connections and disposed in said opening, the other of said connections being left unenclosed and being of smaller cross-section.

11. An alternating current motor having, in combination, a rotor, a plurality of pairs of annularly spaced radially extending pole projections having inner ends defining pole faces adjacent said rotor, means shading corresponding side portions of said pole faces, means providing substantially closed magnetic connections adjacent the rotor and between the shaded and unshaded side tips of each pair of adjacent pole projections, a plurality of magnetic connections equal in number to the number of pairs of said projections and each spaced from one of said first mentioned projections and joined at opposite ends to the outer ends of a pair of said projections, and an alternating current winding enclosing certain of said last mentioned connections, the other connections being left unenclosed but providing a path through the associated pole projections for the flux produced by the energization of said winding.

12. An alternating current motor having, in combination, a rotor, two pairs of annularly spaced pole projections having end faces defining a recess receiving said rotor, a plurality of magnetic members each connecting one pair of said projections remote from said rotor, and an exciting winding enclosing at least one of said members, the side surfaces of each of said pole projections extending toward the rotor being disposed in non-parallel relation and diverging relative to each other toward said rotor recess.

EDGAR D. LILJA.